(12) United States Patent
Lee et al.

(10) Patent No.: US 9,203,064 B2
(45) Date of Patent: *Dec. 1, 2015

(54) BATTERY MODULE HAVING EXCELLENT HEAT DISSIPATION ABILITY AND BATTERY PACK EMPLOYED WITH THE SAME

(75) Inventors: Jin Kyu Lee, Busan (KR); Hee Soo Yoon, Daejeon (KR); BumHyun Lee, Seoul (KR); Dal Mo Kang, Daejeon (KR); Jaeseong Yeo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 999 days.

This patent is subject to a terminal disclaimer.

(21) Appl. No.: 12/851,880

(22) Filed: Aug. 6, 2010

(65) Prior Publication Data

US 2011/0059347 A1 Mar. 10, 2011

Related U.S. Application Data

(63) Continuation of application No. PCT/KR2010/001993, filed on Mar. 31, 2010.

(30) Foreign Application Priority Data

Apr. 1, 2009 (KR) .................. 10-2009-0027936

(51) Int. Cl.
*H01M 2/02* (2006.01)
*H01M 2/10* (2006.01)
(Continued)

(52) U.S. Cl.
CPC ............. *H01M 2/1061* (2013.01); *B60L 11/18* (2013.01); *B60L 11/1874* (2013.01);
(Continued)

(58) Field of Classification Search
CPC ............ H01M 2/0426; H01M 2/0232; H01M 2/0217; H01M 2/023; H01M 2/0225; H01M 2/022; H01M 2/027; H01M 2/046; H01M 2/0473; H01M 2/202; H01M 2/206; H01M 2/305; H01M 2/1061; H01M 2/1066
USPC .......................................................... 429/120
See application file for complete search history.

(56) References Cited

U.S. PATENT DOCUMENTS 5,006,924 A * 4/1991 Frankeny et al. ............. 257/714
8,304,104 B2 * 11/2012 Lee et al. ...................... 429/120
(Continued)

FOREIGN PATENT DOCUMENTS

CN 101171701 A 4/2008
JP 8-321329 A 12/1996
(Continued)

*Primary Examiner* — Maria J Laios
*Assistant Examiner* — Robert S Carrico
(74) *Attorney, Agent, or Firm* — Birch, Stewart, Kolasch & Birch, LLP (57) ABSTRACT

Disclosed herein is a battery module including a plurality of plate-shaped battery cells mounted in a module case in a state in which the plate-shaped battery cells are sequentially stacked, wherein each of the plate-shaped battery cells includes an electrode assembly of a cathode/separator/anode structure mounted in a battery case formed of a laminate sheet including a resin layer and a metal layer, and a plurality of heat dissipation members are disposed in two or more interfaces between the respective plate-shaped battery cells such that heat generated from the plate-shaped battery cells during charge and discharge of the plate-shaped battery cells is removed by thermal conduction through the heat dissipation members.

25 Claims, 8 Drawing Sheets

(51) Int. Cl.

| | | |
|---|---|---|
| *H01M 10/04* | (2006.01) | |
| *H01M 10/613* | (2014.01) | |
| *H01M 10/617* | (2014.01) | |
| *H01M 10/647* | (2014.01) | |
| *H01M 10/6551* | (2014.01) | |
| *H01M 10/6555* | (2014.01) | |
| *H01M 10/6562* | (2014.01) | |
| *F28D 21/00* | (2006.01) | |
| *B60L 11/18* | (2006.01) | |
| *H01M 10/625* | (2014.01) | |
| *H01M 10/42* | (2006.01) | |
| *H01M 10/651* | (2014.01) | |
| *F28F 3/00* | (2006.01) | |
| *H01M 10/653* | (2014.01) | |

(52) U.S. Cl.
CPC ......... *H01M 2/0277* (2013.01); *H01M 2/1077* (2013.01); *H01M 10/0481* (2013.01); *H01M 10/0486* (2013.01); *H01M 10/4207* (2013.01); *H01M 10/613* (2015.04); *H01M 10/617* (2015.04); *H01M 10/625* (2015.04); *H01M 10/647* (2015.04); *H01M 10/651* (2015.04); *H01M 10/6551* (2015.04); *H01M 10/6555* (2015.04); *H01M 10/6562* (2015.04); *F28D 2021/0029* (2013.01); *F28F 3/00* (2013.01); *H01M 2/0275* (2013.01); *H01M 2/0285* (2013.01); *H01M 2/0287* (2013.01); *H01M 10/653* (2015.04); *Y02T 10/705* (2013.01); *Y02T 10/7005* (2013.01)

(56) References Cited

U.S. PATENT DOCUMENTS

| | | | |
|---|---|---|---|
| 8,435,666 B2 * | 5/2013 | Lee et al. ................ | 429/120 |
| 2005/0074666 A1 * | 4/2005 | Kimiya et al. ............ | 429/62 |
| 2005/0208375 A1 * | 9/2005 | Sakurai .................... | 429/162 |
| 2006/0216582 A1 | 9/2006 | Lee et al. | |
| 2006/0286450 A1 * | 12/2006 | Yoon et al. .............. | 429/180 |
| 2007/0172725 A1 * | 7/2007 | Doshi ....................... | 429/120 |
| 2008/0090137 A1 * | 4/2008 | Buck et al. ............... | 429/120 |
| 2009/0029239 A1 * | 1/2009 | Koetting et al. ......... | 429/82 |

FOREIGN PATENT DOCUMENTS

| | | |
|---|---|---|
| JP | 9-120847 A | 5/1997 |
| JP | 2003-7355 A | 1/2003 |
| JP | 2005-222699 A | 8/2005 |
| JP | 2008-47371 A | 2/2008 |
| KR | 10-2008-0032748 A | 4/2006 |
| KR | 10-2006-0102855 A | 9/2006 |
| KR | 10-2008-0042965 A | 5/2008 |
| WO | WO 2007/043392 A1 | 4/2007 |
| WO | WO 2009/061090 A1 | 5/2009 |
| WO | WO 2010/067943 A1 | 6/2010 |

* cited by examiner

BATTERY MODULE HAVING EXCELLENT HEAT DISSIPATION ABILITY AND BATTERY PACK EMPLOYED WITH THE SAME

This application is a Continuation of PCT International Application No. PCT/KR2010/001993 filed on Mar. 31, 2010, which claims the benefit of Patent Application No. 10-2009-0027936 filed in Republic of Korea, on Apr. 1, 2009. The entire contents of all of the above applications is hereby incorporated by reference into the present application.

TECHNICAL FIELD

The present invention relates to a battery module having excellent heat dissipation ability and a middle- or large-sized battery pack including the same, and, more particularly, to a battery module including a plurality of plate-shaped battery cells mounted in a module case in a state in which the plate-shaped battery cells are sequentially stacked, wherein each of the plate-shaped battery cells includes an electrode assembly of a cathode/separator/anode structure mounted in a battery case formed of a laminate sheet including a resin layer and a metal layer, and a plurality of heat dissipation members are disposed in two or more interfaces between the respective plate-shaped battery cells such that heat generated from the plate-shaped battery cells during charge and discharge of the plate-shaped battery cells is removed by thermal conduction through the heat dissipation members.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle- or large-sized devices, such as vehicles, use a middle- or large-sized battery module having a plurality of battery cells electrically connected to one another because high power and large capacity are necessary for the middle- or large-sized devices.

Preferably, the middle- or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle- or large-sized battery module. Especially, much interest is currently focused on the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

Battery cells constituting such a middle- or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof, with the result that it is difficult to effectively lower the overall temperature of the battery cells.

If the heat, generated from the battery module during the charge and discharge of the battery module, is not effectively removed, the heat accumulates in the battery module, with the result that deterioration of the battery module is accelerated. According to circumstances, the battery module may catch fire or explode. For this reason, a cooling system is needed in a battery pack for vehicles, which is a high-power, large-capacity battery, to cool battery cells mounted in the battery pack.

Each battery module mounted in a middle- or large-sized battery pack is generally manufactured by stacking a plurality of battery cells with high integration. In this case, the battery cells are stacked in a state in which battery cells are arranged at predetermined intervals such that heat generated during charge and discharge of the battery cells is removed. For example, battery cells may be sequentially stacked in a state in which the battery cells are arranged at predetermined intervals without using an additional member. Alternatively, in a case in which the battery cells have low mechanical strength, one or more battery cells are mounted in a cartridge, and a plurality of cartridges are stacked to constitute a battery module. In order to effectively remove heat accumulating between the stacked battery cells or between the stacked battery modules, coolant channels may be defined between the stacked battery cells or between the stacked battery modules.

In this structure, however, it is necessary to provide a plurality of coolant channels corresponding to the number of the battery cells, with the result that the overall size of the battery module is increased.

Also, coolant channels having relatively small intervals are provided in a case in which a plurality of battery cells are stacked in consideration of the size of the battery module. As a result, design of the cooling structure is complicated. That is, the coolant channels have relatively small intervals as compared with a coolant inlet port, with the result that high pressure loss is caused. Consequently, it is very difficult to design the shape and location of a coolant inlet port and a coolant outlet port. Also, a fan may be further provided to prevent such pressure loss. In this case, however, design may be restricted in terms of power consumption, fan noise, space, etc.

Furthermore, it may not be possible to obtain intended cooling efficiency due to thermal conduction resistance between members used to configure a cooling structure.

Consequently, there is a high necessity for a battery module that provides high power and large capacity, that can be manufactured in a simple and compact structure, and that provides excellent life span and safety.

DISCLOSURE

Technical Problem

Therefore, the present invention has been made to solve the above problems, and other technical problems that have yet to be resolved.

It is an object of the present invention to provide a battery module wherein the overall temperature of the battery module is uniformly maintained by removing heat through air cooling type thermal conduction, thereby reducing temperature deviation of the battery module while restraining the increase in size of the battery module.

It is another object of the present invention to provide a battery module wherein thermal conduction resistance between members used to configure the battery module is minimized, thereby maximizing cooling efficiency in the same structure.

Technical Solution

In accordance with one aspect of the present invention, the above and other objects can be accomplished by the provision of a battery module including a plurality of plate-shaped battery cells mounted in a module case in a state in which the plate-shaped battery cells are sequentially stacked, wherein each of the plate-shaped battery cells includes an electrode assembly of a cathode/separator/anode structure mounted in a battery case formed of a laminate sheet including a resin layer and a metal layer, and a plurality of heat dissipation members are disposed in two or more interfaces between the respective plate-shaped battery cells such that heat generated from the plate-shaped battery cells during charge and discharge of the plate-shaped battery cells is removed by thermal conduction through the heat dissipation members.

Generally, a battery module is configured in a structure in which battery cells are stacked while being arranged at predetermined intervals to form coolant channels such that air flows through the coolant channels (in an air cooling type) to prevent overheating of the battery cells. However, this type of battery module does not provide a sufficient heat dissipation effect.

In the battery module with the above-stated construction according to the present invention, on the other hand, a plurality of heat dissipation members are disposed in two or more interfaces between the battery cells. Consequently, it is possible to cool the battery cell stack with higher cooling efficiency than a conventional cooling system without the provision of spaces between the respective battery cells or although small spaces are provided between the respective battery cells, and therefore, it is possible to maximize heat dissipation efficiency of the battery module and to stack the battery cells with high integration.

In a preferred example, the battery module may be configured in a structure in which an air cooling type heat exchange member is mounted at one side of the battery cell stack for integrally connecting the heat dissipation members to each other such that heat generated from the plate-shaped battery cells during charge and discharge of the plate-shaped battery cells is removed by thermal conduction through the air cooling type heat exchange member via the heat dissipation members.

In the battery module with the above-stated construction, therefore, a plurality of heat dissipation members are disposed in two or more interfaces between the battery cells, and an air cooling type heat exchange member is mounted at one side of the battery cell stack for integrally connecting the heat dissipation members to each other. Consequently, it is possible to more effectively remove heat generated from the battery cells by thermal conduction.

Preferably, each of the battery cells is a light weight pouch-shaped battery including an electrode assembly mounted in a battery case formed of a laminate sheet including an inner resin layer, which is thermally weldable, an isolation metal layer, and an outer resin layer exhibiting excellent durability.

Preferably, each of the battery cells is mounted in a battery cartridge configured in a frame structure. This structure is preferably applied to a battery having sealing portions formed at the outer circumference of the battery by thermal welding.

In the above structure, the battery cartridge includes at least one pair of plate-shaped frames for fixing an outer circumference of a corresponding one of the battery cells in a state in which at least one major surface of the corresponding one of the battery cells is exposed, and the frames are provided at the outsides thereof with elastic pressing members for fixing the heat dissipation members to the exposed major surface of the corresponding one of the battery cells in a tight contact manner.

Therefore, in a case in which a plurality of cartridges, in which battery cells are mounted, are stacked, and heat dissipation members are disposed between the respective cartridges, the elastic pressing members provided at the outsides of the frames increase structural stability of the cartridge stack and enable the heat dissipation members to be effectively fixed to the cartridge stack.

Since each of the cartridges includes at least one pair of plate-shaped frames, not only one battery cell but also two or more battery cells may be mounted in each of the cartridges. For example, in a structure in which two battery cells are mounted in each of the cartridges, a middle frame is provided between the battery cells such that one of the battery cells is disposed between the upper frame and the middle frame, and the other battery cell is disposed between the middle frame and the lower frame. Even in this structure, the heat dissipation members are disposed at the outsides of the respective battery cells in a tight contact manner, and therefore, it is possible to provide a heat dissipation effect through thermal conduction.

The structure of the elastic pressing members is not particularly restricted as long as the elastic pressing members are mounted to the frames for fixing the heat dissipation members upon assembling the battery module. For example, the elastic pressing members may be provided at upper and lower ends and/or left and right sides of the frames.

Consequently, the heat dissipation members are effectively pressed against the frames by the elastic pressing members mounted to the outsides of the frames in a tight contact manner for increasing a degree to which the heat dissipation members are fixed to the frames, with the result that it is not necessary to use an additional member for fixing the heat dissipation members.

According to circumstances, the elastic pressing members may be further mounted at the insides of the frames which are in contact with the sealing portions of the battery cells.

In a preferred example, each of the battery cells may be mounted between the frames in a state in which the exposed major surface of each of the battery cells protrudes outward from a corresponding one of the frames, and the elastic pressing members may be provided at the outsides of the frames in a state in which the elastic pressing members have a greater height than a protruding height of each of the battery cells at the exposed major surface thereof.

That is, the frames formed lower than the height of the battery cells fix only the outer circumferences of the battery cells, and therefore, it is possible to achieve effective heat dissipation through the protruding exposed major surfaces of the battery cells. Also, upon application of the heat dissipation members, the elastic pressing members mounted higher than the height of the battery cells at the protruding exposed major surfaces of the battery cells effectively press the heat dissipation members to the exposed major surfaces of the battery cells in a tight contact manner, and therefore, it is possible to increase overall mechanical strength of a battery module without increasing the size of the battery module using the heat dissipation members.

A material for the elastic pressing members mounted at the outsides of the frames is not particularly restricted as long as the elastic pressing members can exhibit high elastic pressing force when the elastic pressing members are pressed. Preferably, each of the elastic pressing members includes a polymer resin exhibiting high elastic pressing force. Such a polymer resin may be a material that is capable of exhibiting high elastic force or may have a structure or shape that is capable of exhibiting high elastic force. A representative example of the former may be rubber, and a representative example of the latter may be foamed polymer resin.

The elastic pressing members may be mounted to the frames in various manners. In order to more efficiently mount the elastic pressing members to the frames, the frames may be provided at the outsides thereof with grooves, in which the elastic pressing members may be mounted.

Each of the elastic pressing members may have a width equivalent to 10% or more of the width of each of the frames. If the width of each of the elastic pressing members is too small as compared with the width of each of the frames, an effect obtained by mounting the elastic pressing members to the frames may be exhibited. On the other hand, if the width of each of the elastic pressing members is too large as compared with the width of each of the frames, the elastic pressing members, which are elastically deformed when the elastic pressing members are pressed, cover large portions of the heat dissipation members, with the result that a heat dissipation effect may be lowered. Furthermore, the elastic pressing members may protrude out of the frames when the elastic pressing members are pressed, which is not preferable. Of course, therefore, the width of each of the elastic pressing members may exceed the above defined range unless the above problems are caused.

Meanwhile, a material for the heat dissipation members is not particularly restricted as long as the heat dissipation members exhibit high thermal conductivity. For example, the heat dissipation members may be formed of a sheet having a thermal conductivity of 20 to 500 W/(m.K). Examples of such a sheet may include aluminum, copper, and polymer, to which, however, the present invention is not limited.

The heat dissipation members may be disposed in all of the interfaces between the battery cells or in some of the interfaces between the battery cells. For example, in a case in which the heat dissipation members is disposed in all of the interfaces between the battery cells, the respective battery cells are in contact with different heat dissipation members at opposite sides thereof. On the other hand, in a case in which the heat dissipation members are disposed in some of the interfaces between the battery cells, some of the battery cells may be in contact with the heat dissipation members only at one side thereof.

Also, a material for the air cooling type heat exchange member is not particularly restricted as long as the air cooling type heat exchange member exhibits high thermal conductivity. Preferably, the air cooling type heat exchange member is made of a material having a thermal conductivity of 20 to 500 W/(m.K). The heat dissipation members are connected to the air cooling type heat exchange member, and therefore, it is possible to efficiently achieve heat transfer.

Preferably, the heat dissipation members are disposed in the interfaces between the battery cells in a state in which at least a portion of each of the heat dissipation members is exposed outward from the stacked battery cells, and the outwardly exposed portions of the heat dissipation members are bent in a lateral direction of the battery cells. That is, the heat dissipation members disposed in the interfaces between the battery cells receive heat generated from the battery cells and easily transmit the received heat to the air cooling type heat exchange member through the bent portions thereof, thereby effectively achieving dissipation of heat from the battery cells.

The air cooling type heat exchange member may be mounted at the tops of the bent portions of the heat dissipation members in various manners, such as welding and mechanical coupling. Therefore, heat generated from the battery cells is transmitted to the heat dissipation members disposed between the battery cells and is then effectively discharged via the air cooling type heat exchange member mounted at one side of the battery cell stack.

In the above structure, a thermal interface material is preferably provided between the tops of the bent portions of the heat dissipation members and the air cooling type heat exchange member for more efficiently achieving heat transfer between the heat dissipation members and the air cooling type heat exchange member. The thermal interface material is a kind of interface material having a heat conduction function. The thermal interface material serves to minimize thermal resistance. Examples of the thermal interface material may include a thermally conductive grease, a thermally conductive epoxy-based bond, a thermally conductive silicone pad, a thermally conductive adhesive tape, and a graphite sheet, to which, however, the present invention is not limited. Also, the above materials may be used alone or in combination of two or more thereof.

Since the thermal interface material, which minimizes thermal resistance caused by contact between metals, is disposed between the tops of the bent portions of the heat dissipation members and the air cooling type heat exchange member having large thermal convection area, as described above, it is possible to more efficiently achieve the transfer of heat to the air cooling type heat exchange member.

Furthermore, the addition of such a thermal interface material, which provides high thermal conduction efficiency, enables the structure of the air cooling type heat exchange member to be designed in various shapes.

Depending upon kinds of the thermal interface material, the thermal interface material may be provided at the heat dissipation members and/or the air cooling type heat exchange member through application or may be provided in the form of an additional sheet.

For example, the air cooling type heat exchange member may be configured in a structure including a bottom part, at a lower end surface of which the heat dissipation members are disposed in a tight contact manner, and a plurality of heat dissipation fins extending upward from the bottom part.

Therefore, heat transmitted to the heat dissipation members from the battery cells is conducted via the lower end surface of the bottom part, and is then discharged to the outside through thermal convection between the heat and the heat dissipation fins each having a large surface area, thereby achieving effective dissipation of heat from the battery cells.

Since heat generated from the battery cells is effectively transferred from the heat dissipation members to the air cooling type heat exchange member via the thermal interface material, it is possible to more flexibly configure the air cooling type heat exchange member, particularly the heat dissipation fins, as previously described.

Specifically, the heat dissipation fins of the air cooling type heat exchange member may extend upward from the bottom part in a longitudinal direction of the air cooling type heat exchange member. Alternatively, the heat dissipation fins of the air cooling type heat exchange member may extend upward from the bottom part in a lateral direction of the air cooling type heat exchange member.

The heat dissipation efficiency of the air cooling type heat exchange member greatly depends upon the surface area of the air cooling type heat exchange member. The surface area of the air cooling type heat exchange member is the sum of a surface area of the bottom part and exposed surface areas of the heat dissipation fins extending upward from the bottom part. For example, the surface area of the air cooling type heat exchange member may be decided based on the width of the bottom part and the height of and intervals between the heat dissipation fins. Therefore, the surface area of the air cooling type heat exchange member is increased when the width of the bottom part is large, the height of the heat dissipation fins is large, and the intervals between the heat dissipation fins are small.

When the surface area of the air cooling type heat exchange member is increased, the heat dissipation efficiency is also increased. However, if the intervals between the heat dissipation fins are set excessively small to secure a larger surface area, coolant flow resistance is increased, and therefore, cooling efficiency is lowered, with the result that heat dissipation efficiency according to the increase of size is lowered, and the overall size of the battery module is increased, which is not preferable.

In consideration of the above description, it is preferable for the air cooling type heat exchange member to have a surface area equivalent to 7 to 15 times the surface area of each of the battery cells.

Meanwhile, the length, the width, and the height of the air cooling type heat exchange member may be selected as needed within a range in which the air cooling type heat exchange member has maximum heat dissipation efficiency while the air cooling type heat exchange member has a minimum length, width, and height. For example, the air cooling type heat exchange member may have a length equivalent to 30 to 70% of the length of the battery cell stack. Also, the air cooling type heat exchange member may have a width equivalent to 50 to 120% of the width of the battery cell stack. In addition, the air cooling type heat exchange member may have a height equivalent to 20 to 50% of the height of the battery cell stack.

Meanwhile, a position of the air cooling type heat exchange member is not particularly restricted as long as the air cooling type heat exchange member is mounted to one side of the battery cell stack for easily removing heat generated from the battery cells. Preferably, the air cooling type heat exchange member is mounted to the top or the bottom of the module case. More preferably, the air cooling type heat exchange member is mounted to the top of the module case. Consequently, heat generated from the battery cells is dissipated out of the module case at high efficiency.

According to circumstances, the module case may be provided at the upper end or the lower end thereof with a depression having a size sufficient to receive the air cooling type heat exchange member, and the air cooling type heat exchange member may have a height equal to or less than the height of the top or the bottom of the module case when the air cooling type heat exchange member is mounted in the depression. In this structure, even in a case in which a plurality of battery modules are stacked in the direction in which the air cooling type heat exchange member is mounted, there is no difficulty in stacking the battery modules due to the air cooling type heat exchange member, and therefore, the above structure is preferable in manufacturing a middle- or large-sized battery pack having high power and large capacity.

That is, since the battery module according to the present invention is configured in an indirect cooling type structure using the heat dissipation members, as previously described, it is possible to flexibly configure the air cooling type heat exchange member in the longitudinal direction or in the lateral direction based on the characteristics and construction of the battery module. In addition, such a flexible configuration enables various designs with respect to factors related to installation position of a cooling fan and a flow structure, which is very preferable.

Of course, the heat dissipation members having the above specific structure according to the present invention may by applied to a battery module including prismatic battery cells as well as the battery module including the previously described pouch-shaped battery cells as the plate-shaped battery cells.

In accordance with another aspect of the present invention, therefore, there is provided a battery module including a plurality of prismatic battery cells mounted in a module case in a state in which the prismatic battery cells are sequentially stacked.

Specifically, the battery module is configured in a structure in which each of the prismatic battery cells includes an electrode assembly of a cathode/separator/anode structure disposed in a prismatic container together with an electrolyte in a hermetically sealed manner, and a plurality of heat dissipation members are disposed in two or more interfaces between the respective prismatic battery cells such that heat generated from the prismatic battery cells during charge and discharge of the prismatic battery cells is removed by thermal conduction through the heat dissipation members.

In the battery module according to the present invention, therefore, a plurality of heat dissipation members are disposed in two or more interfaces between the respective prismatic battery cells, with the result that it is possible to cool the battery cell stack with higher cooling efficiency than a conventional cooling system without the provision of spaces between the respective prismatic battery cells or although small spaces are provided between the respective prismatic battery cells, whereby it is possible to maximize heat dissipation efficiency of the battery module and to stack the prismatic battery cells with high integration.

Of course, it is possible to further mount an air cooling type heat exchange member configured as previously described to the battery module including the prismatic battery cells.

That is, the air cooling type heat exchange member may be mounted at one side of the battery cell stack for integrally connecting the heat dissipation members to each other such that heat generated from the prismatic battery cells during charge and discharge of the prismatic battery cells is removed by thermal conduction through the air cooling type heat exchange member via the heat dissipation members.

In accordance with another aspect of the present invention, there is provided a cooling device including two or more heat dissipation members disposed in interfaces between battery cells and an air cooling type heat exchange member mounted to corresponding sides of the heat dissipation members for removing heat transmitted from the heat dissipation members.

The cooling device is a novel member and provides various advantages as previously described.

In a preferred example, the air cooling type heat exchange member may be configured in a structure including a bottom part, at a lower end surface of which the heat dissipation members are disposed in a tight contact manner, and a plurality of heat dissipation fins extending upward from the bottom part, as previously described.

Meanwhile, a middle- or large-sized battery pack uses a plurality of battery cells in order to provide high power and large capacity. In battery modules constituting such a battery pack, higher heat dissipation efficiency is needed to secure safety of the battery pack.

In accordance with a further aspect of the present invention, therefore, there is provided a battery pack manufactured by combining battery modules based on desired power and capacity.

The battery pack according to the present invention includes a plurality of battery cells in order to provide high power and large capacity. Consequently, the battery pack according to the present invention is preferably used as a power source for electric vehicles, hybrid electric vehicles, or plug-in hybrid electric vehicles in which high-temperature heat generated during the charge and discharge of the battery cells is a serious safety concern.

Particularly in the electric vehicles and plug-in hybrid electric vehicles, which require high power from the battery pack for a long period of time, a high heat dissipation property is needed. Therefore, the battery pack according to the present invention is more preferably used as a power source for the electric vehicles or the plug-in hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
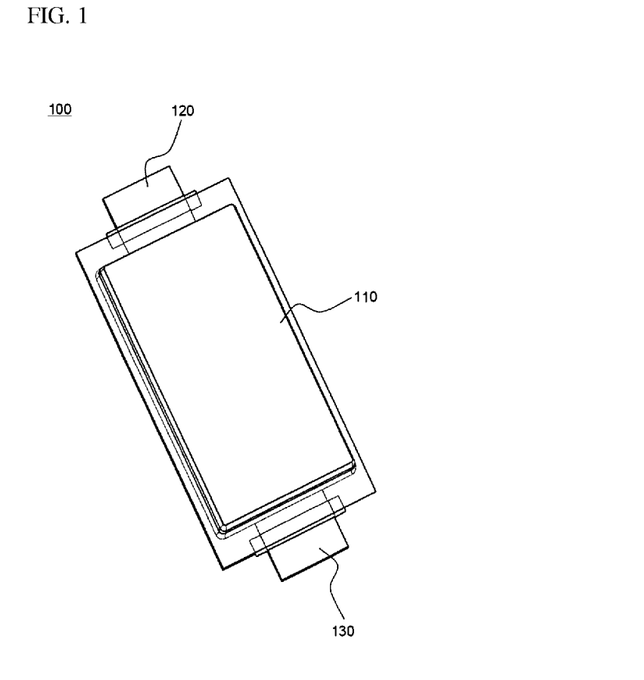
FIG. 1 is a typical view illustrating a plate-shaped battery cell.

FIG. 1 is a typical view illustrating a plate-shaped battery cell.

Referring to FIG. 1, a plate-shaped battery cell 100 includes an electrode assembly (not shown) of a cathode/separator/anode structure mounted in a battery case 110 formed of a laminate sheet including a resin layer and a metal layer. A cathode terminal 120 and an anode terminal 130, which are electrically connected to the electrode assembly, protrude from the upper end and the lower end of the battery case 110.

Figure 2:
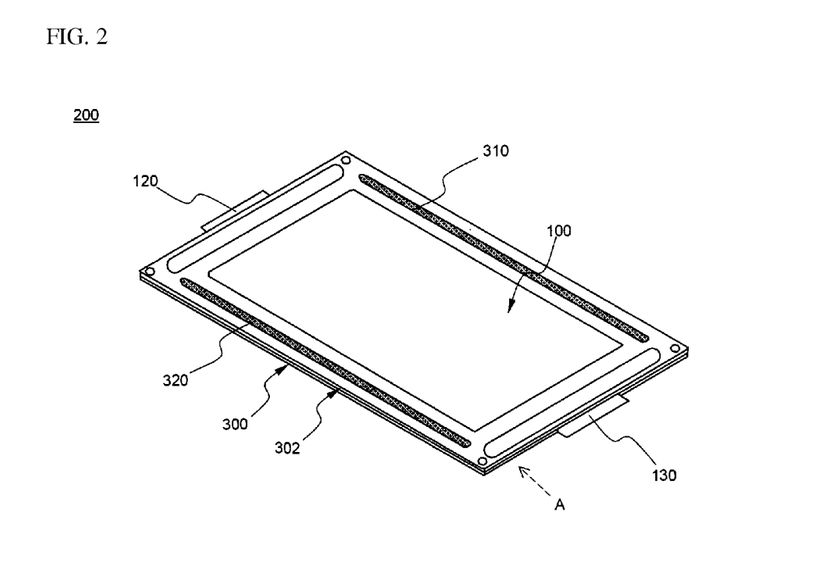
FIG. 2 is a perspective view illustrating a battery cartridge having the battery cell of FIG. 1 mounted therein.
Figure 3:
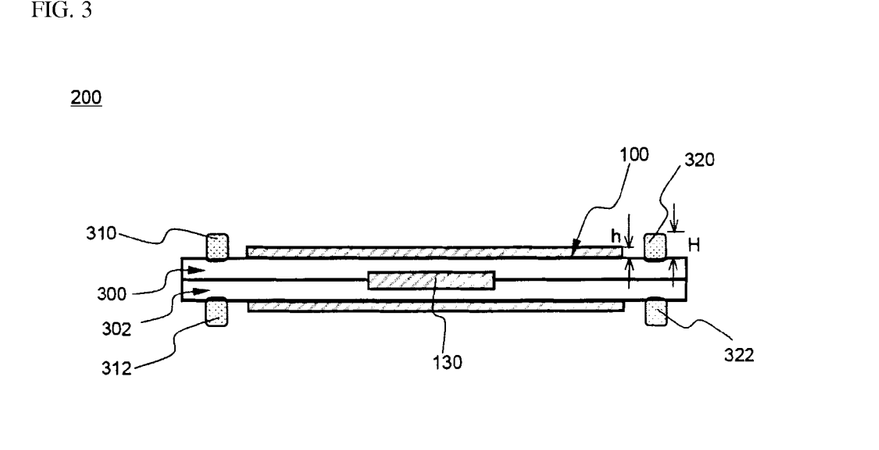
FIG. 3 is a vertical sectional view illustrating the battery cartridge of FIG. 2 when viewed in a direction A.

FIG. 2 is a perspective view typically illustrating a battery cartridge having the battery cell of FIG. 1 mounted therein, and FIG. 3 is a vertical sectional view typically illustrating the battery cartridge of FIG. 2 when viewed in a direction A.

Referring to these drawings, a battery cartridge 200 has the plate-shaped battery cell 100 mounted therein. The electrodes 120 and 130 of the plate-shaped battery cell 100 protrude outward from the battery cartridge 200. The battery cartridge 200 includes a pair of plate-shaped frames 300 and 302 for fixing the outer circumference of the battery cell 100 in a state in which opposite major surfaces of the battery cell 100 are exposed.

Elastic pressing members 310, 320, 312, and 322 are provided at the outsides, specifically the left and right sides, of the frames 300 and 302 in parallel in the longitudinal direction thereof.

Also, the battery cell 100 is mounted between the frames 300 and 302 in a state in which the exposed major surfaces of the battery cell 100 protrude outward from the frames 300 and 302. The elastic pressing members 310, 320, 312, and 322 are provided at the outsides of the frames 300 and 302 in a state in which the elastic pressing members 310, 320, 312, and 322 have a greater height H than a protruding height h of the battery cell 100 at the exposed major surfaces thereof. Upon application of heat dissipation members (not shown), therefore, it is possible for the elastic pressing members 310, 320, 312, and 322 to provide elastic pressing force with respect to the heat dissipation members (not shown). Also, the applied heat dissipation members (not shown) are effectively pressed to the exposed major surfaces of the battery cell 100 in a tight contact manner by the elastic pressing members 310, 320, 312, and 322, and therefore, it is possible to achieve effective heat dissipation without increasing the size of a battery module using the heat dissipation members.

Figure 4:
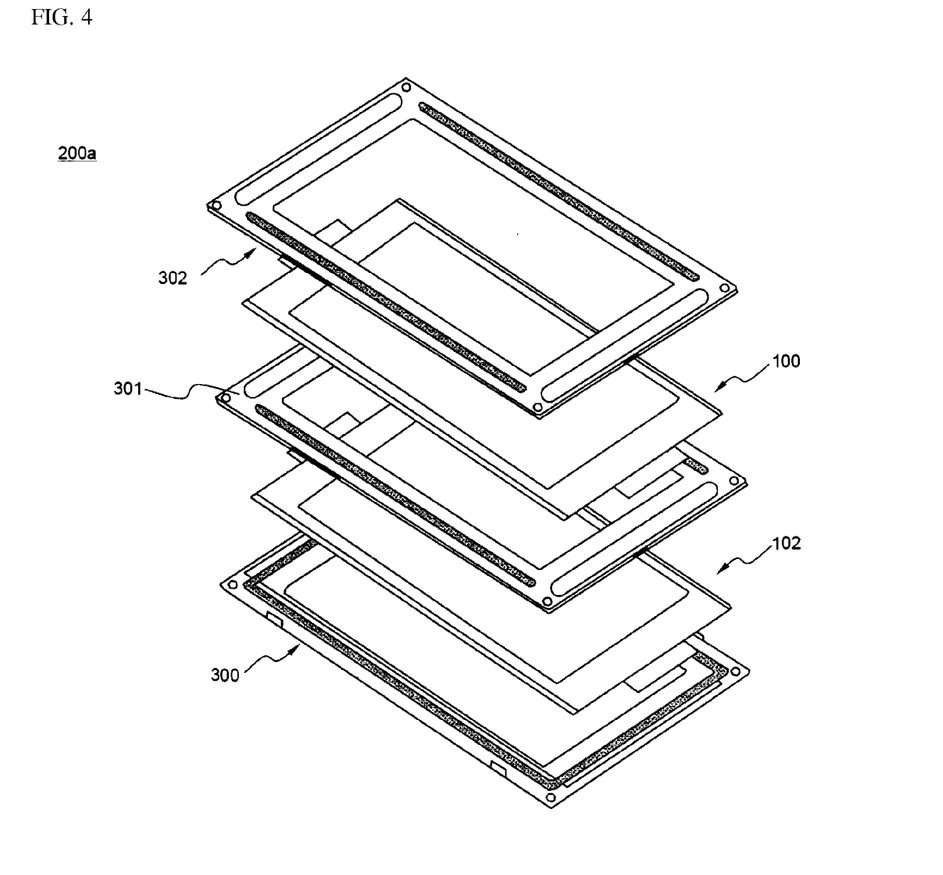
FIG. 4 is an exploded view illustrating a battery cartridge including two battery cells.
Figure 5:
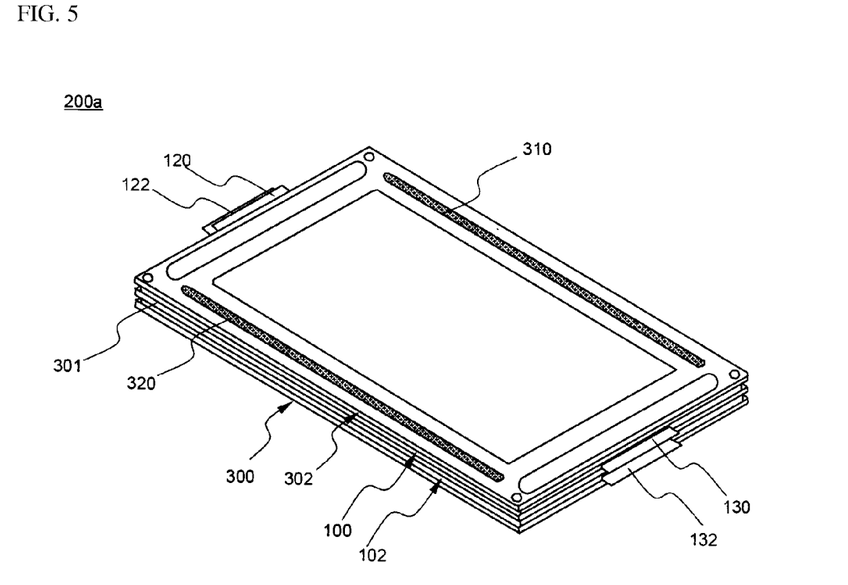
FIG. 5 is a perspective view illustrating the battery cartridge of FIG. 4.

FIG. 4 is an exploded view typically illustrating a battery cartridge including two battery cells, and FIG. 5 is a perspective view typically illustrating the battery cartridge of FIG. 4.

Referring to these drawings, a battery cartridge 200a is identical to the battery cartridge of FIG. 2 except that two plate-shaped battery cells 100 and 102 are mounted in the battery cartridge 200a in a stated state, and a middle frame 301 is further provided between the battery cells 100 and 102, and therefore, a detailed description thereof will not be given.

In this structure, it is possible to achieve an excellent heat dissipation effect through thermal conduction even in a case in which heat dissipation members (not shown) are provided at the major surfaces of the battery cells 100 and 102. As compared with the structure of FIG. 2, therefore, the heat dissipation members are pressed to the major surfaces of the battery cells 100 and 102 in a tight contact manner by elastic pressing members 310 and 320 provided at a pair of frames 300 and 302 and the middle frame 301, and therefore, it is possible to achieve effective heat dissipation while minimizing the increase in size of a battery module.

Figure 6:
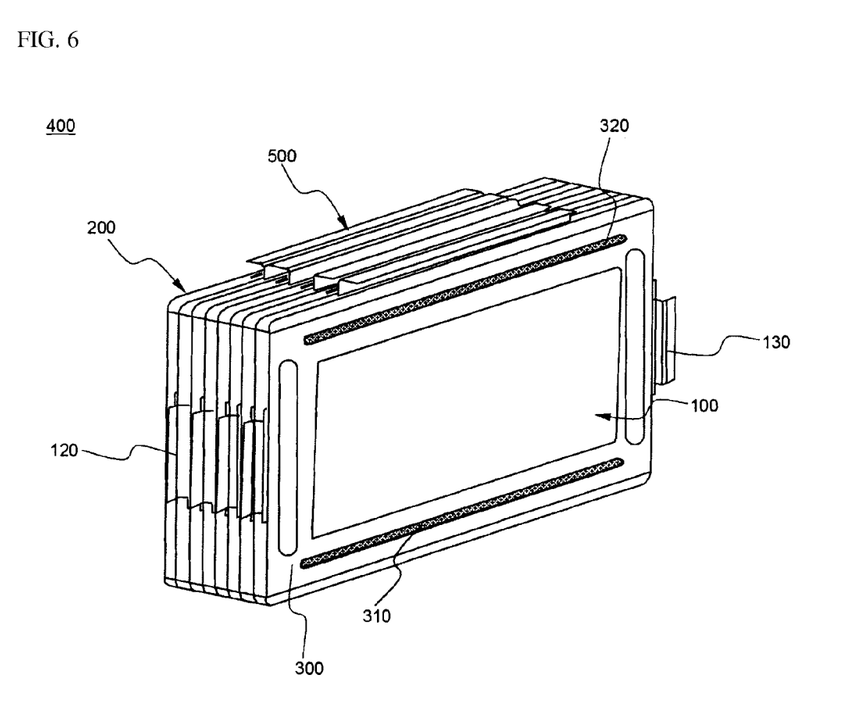
FIG. 6 is a typical view illustrating a battery module in which heat dissipation members are disposed between respective battery cartridges, one of which is shown in FIG. 2.
Figure 7:
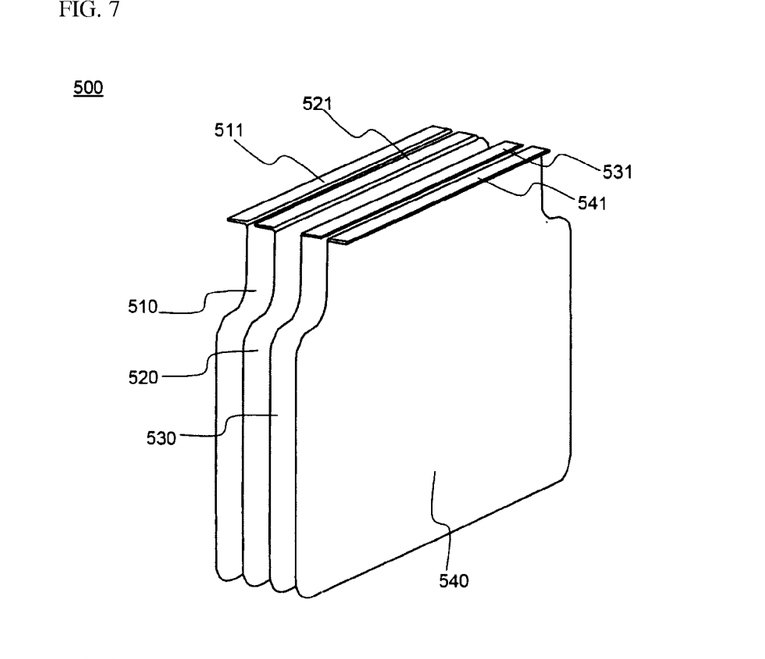
FIG. 7 is a typical view illustrating the heat dissipation members of FIG. 6.

FIG. 6 is a typical view typically illustrating a battery module 400 in which heat dissipation members are disposed between respective battery cartridges, one of which is shown in FIG. 2, and FIG. 7 is a typical view typically illustrating the heat dissipation members of FIG. 6.

Referring to these drawings, the battery module 400 includes eight cartridges 200, which are sequentially stacked, and four heat dissipation members 500 are disposed in some interfaces between the cartridges 200 such that heat generated from the cartridges 200 (specifically, heat generated from the battery cells mounted in the respective cartridges) is conducted to the heat dissipation members so as to achieve a high heat dissipation effect.

Elastic pressing members 310 and 320 provided at the outsides of the frames 300 of the eight cartridges 200 assist the heat dissipation members 500 to be stably mounted and fixed to the frames 300.

Meanwhile, the respective heat dissipation members 510, 520, 530, and 540 are made of copper sheets exhibiting high thermal conductivity. Outwardly exposed portions 511, 521, 531, and 541 of the heat dissipation members 510, 520, 530, and 540 are bent in the lateral direction of the cartridges 200.

Figure 8:
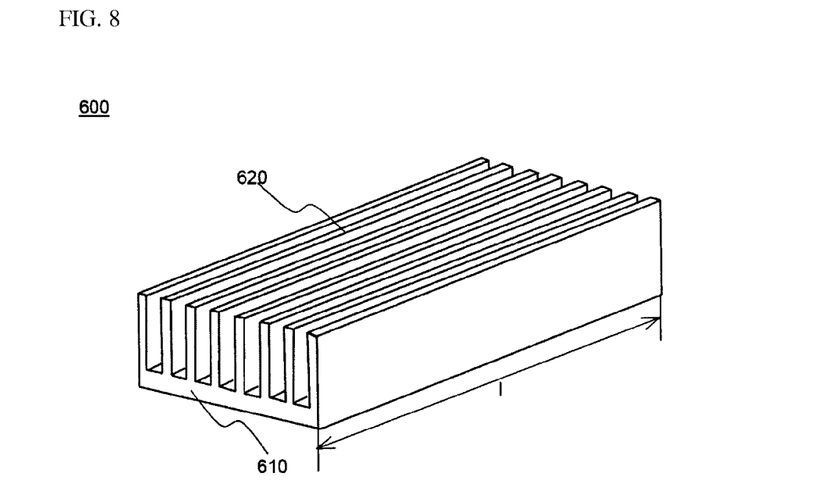
FIG. 8 is an enlarged typical view illustrating a heat exchange member extending in the longitudinal direction.

FIG. 8 is a typical view illustrating an air cooling type heat exchange member according to an embodiment of the present invention.

Referring to FIG. 8, an air cooling type heat exchange member 600 is configured in a structure including a bottom part 610, at the lower end surface of which the heat dissipation members 500 are disposed in a tight contact manner, and a plurality of heat dissipation fins 620 extending upward from the bottom part 610.

The air cooling type heat exchange member 600 is made of an aluminum material exhibiting high thermal conductivity. The heat dissipation fins 620 extend upward from the bottom part 610 in the longitudinal direction l of the air cooling type heat exchange member 600.

Figure 9:
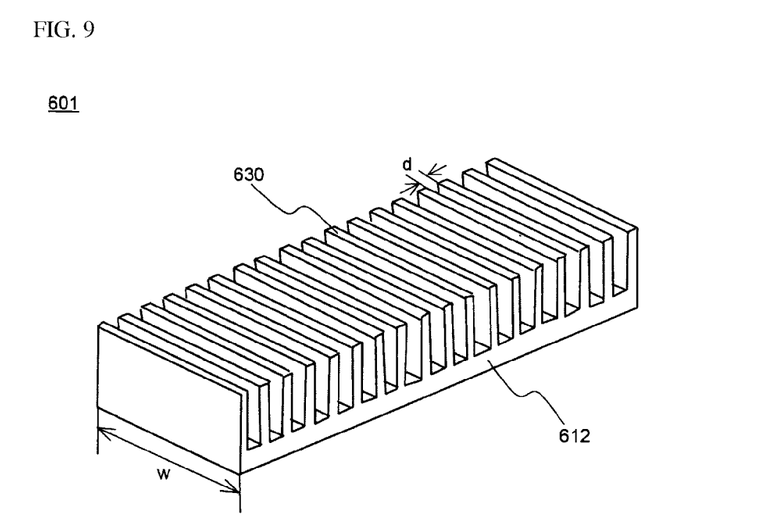
FIG. 9 is an enlarged typical view illustrating a heat exchange member extending in the lateral direction.

FIG. 9 is a typical view illustrating an air cooling type heat exchange member according to another embodiment of the present invention.

An air cooling type heat exchange member 601 of FIG. 9 is identical to the air cooling type heat exchange member 600 of FIG. 8 except that heat dissipation fins 630 of the air cooling type heat exchange member 601 extend upward from a bottom part 612 in the lateral direction w of the air cooling type heat exchange member 601, and therefore, a detailed description thereof will not be given.

Figure 10:
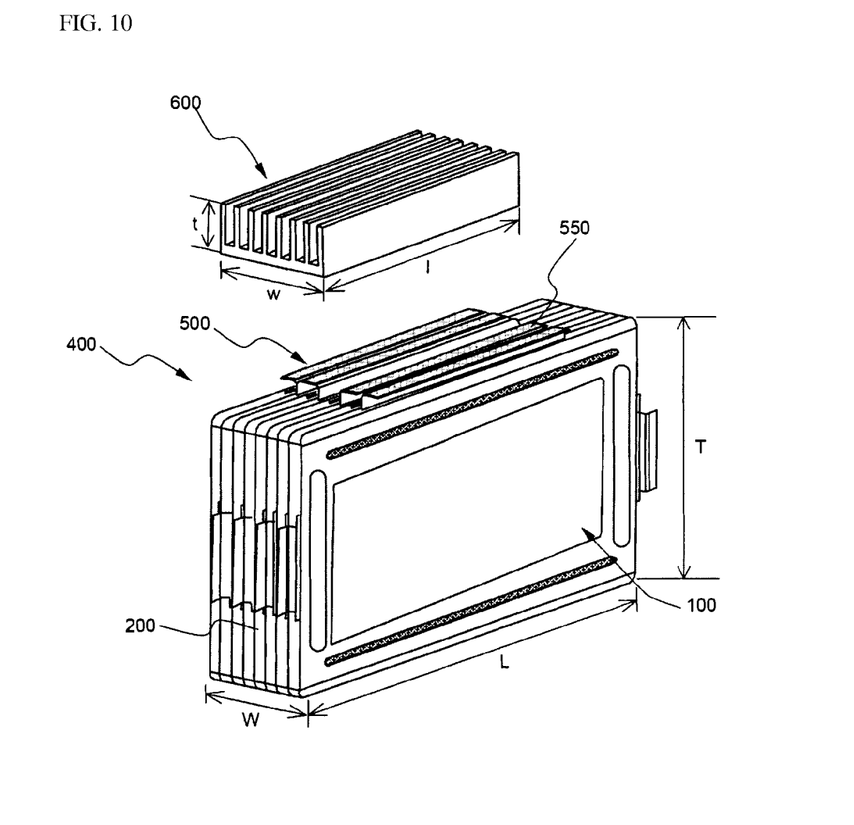
FIG. 10 is a typical view illustrating a battery module according to an embodiment of the present invention before a heat exchange member is mounted to one side of the battery module.
Figure 11:
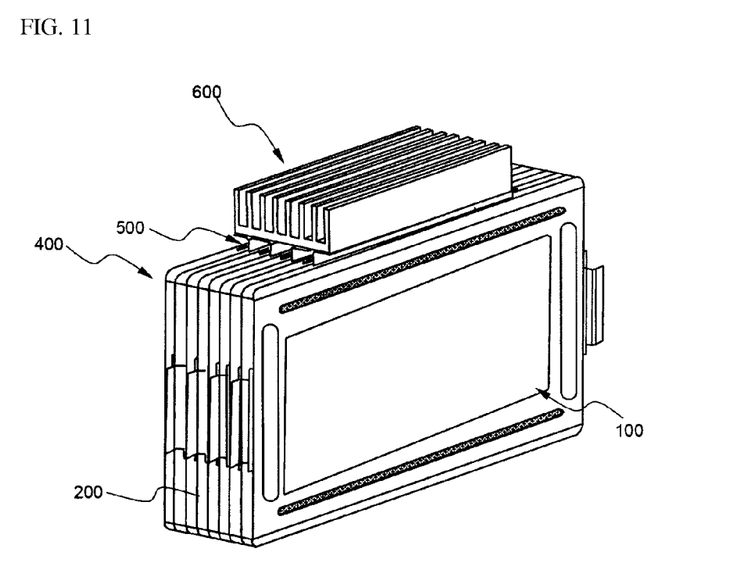
FIG. 11 is a typical view illustrating a structure in which the heat exchange member is mounted to one side of the battery module according to the embodiment of the present invention.

FIG. 10 is a typical view illustrating a battery module according to an embodiment of the present invention and an air cooling type heat exchange member, and FIG. 11 is a typical view illustrating a structure in which the heat exchange member is mounted to one side of the battery module of FIG. 10.

Referring to these drawings, a battery module 400 is configured in a structure in which an air cooling type heat exchange member 600 is mounted at the top of a battery cell stack obtained by sequentially stacking a plurality of cartridges 200 having battery cells 100 mounted therein.

Also, a thermal interface material 550, such as thermally conductive grease, is provided between the air cooling type heat exchange member 600 and the tops of bent portions of heat dissipation members 500 so as to achieve more effective heat transfer. Consequently, it is possible to flexibly configure the air cooling type heat exchange member 600.

That is, heat generated from the battery cells 100 during charge and discharge of the battery cells 100 is transmitted to the heat dissipation members 500 disposed between the cartridges 200, and is then discharged to the outside through the air cooling type heat exchange member 600 via the thermal interface material 550. Consequently, it is possible to achieve high heat dissipation efficiency while the entirety of the battery module is configured in a compact structure.

Also, the air cooling type heat exchange member 600 has a length l equivalent to approximately 60% of a length L of the battery cell stack, a width w equivalent to approximately 100% of a width W of the battery cell stack, and a height t equivalent to approximately 30% of a height T of the battery cell stack. In addition, the air cooling type heat exchange member 600 has a surface area equivalent to approximately 10 times the surface area of each of the battery cells 100.

Figure 12:
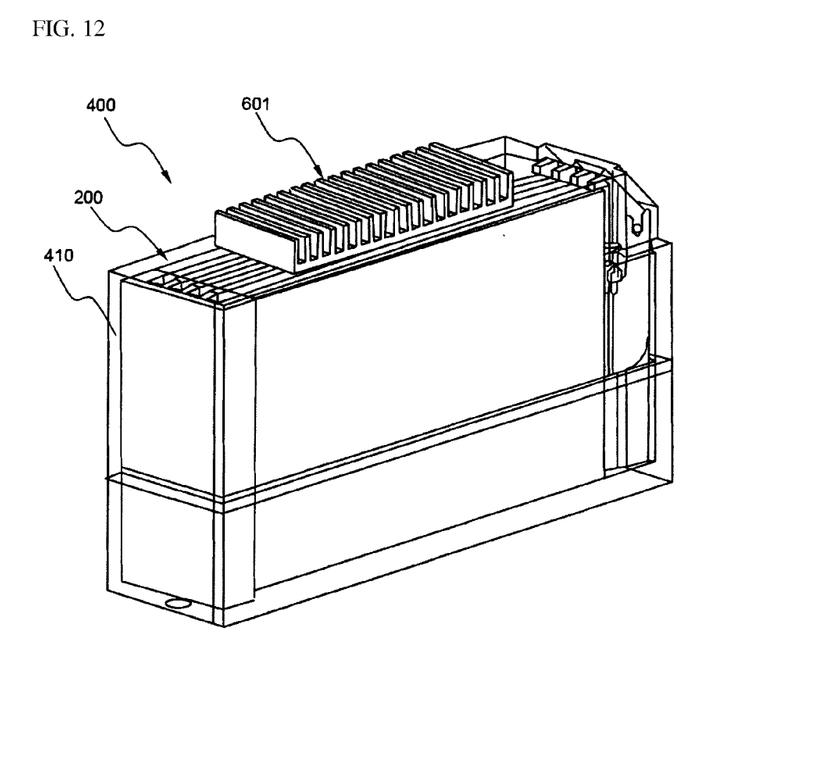
FIG. 12 is a typical view illustrating a structure in which a heat exchange member is mounted to one side of a module case according to another embodiment of the present invention.

FIG. 12 is a typical view illustrating a structure in which a heat exchange member is mounted to one side of a module case according to another embodiment of the present invention.

Referring to FIG. 12 together with FIG. 9, a battery module 400 mounted in a module case 410 is configured in a structure in which an air cooling type heat exchange member 601 is mounted at the top of a battery cell stack obtained by sequentially stacking eight cartridges 200 having battery cells 100 mounted therein.

The structure of FIG. 12 is identical to the structure of FIG. 11 except that the air cooling type heat exchange member 601, a plurality of heat dissipation fins 630 of which extend upward from a bottom part 612 in the lateral direction w of the air cooling type heat exchange member 601, is mounted at the top of the module case 410, and therefore, a detailed description thereof will not be given.

That is, the heat dissipation fins 630 of the air cooling type heat exchange member 601 are arranged at predetermined intervals d necessary for air flow, and therefore, it is possible to remove heat transmitted from a heat dissipation member 500 through conduction with high reliability and excellent cooling efficiency.

Figure 13:
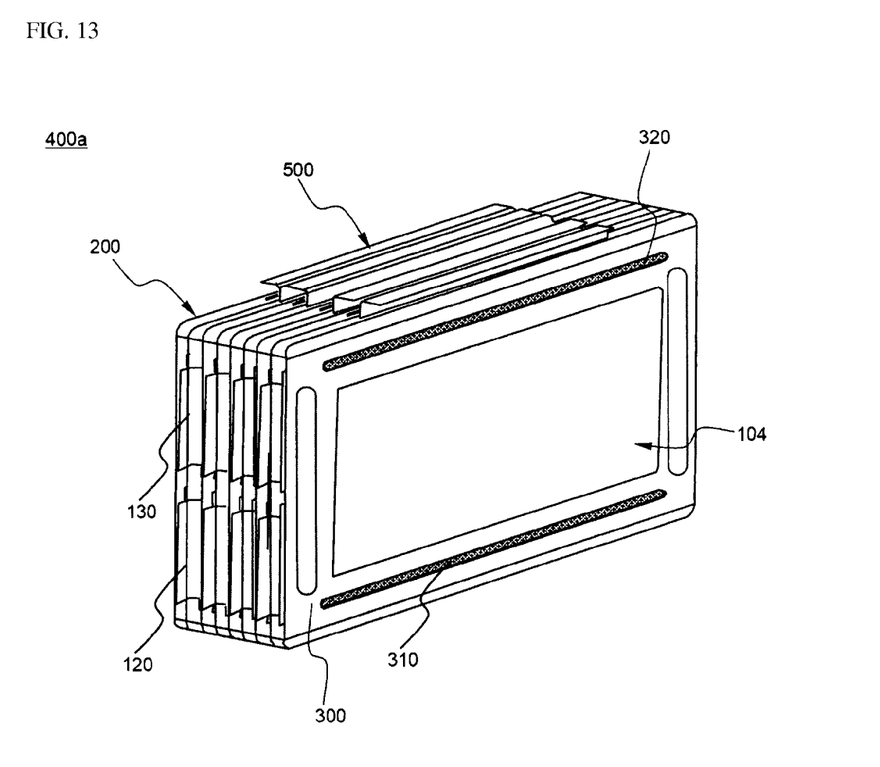
FIGS. 13 and 14 are typical views illustrating battery modules according to other embodiments of the present invention.
Figure 14:
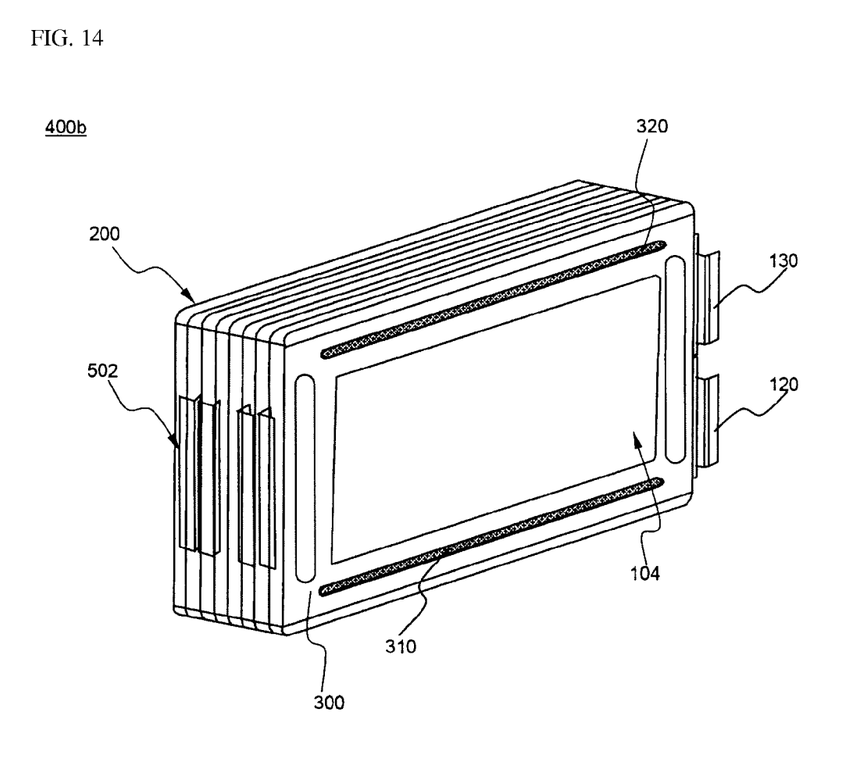

FIGS. 13 and 14 are typical views illustrating battery modules according to other embodiments of the present invention.

Referring to these drawings, a battery module 400a of FIG. 13 is configured in a structure in which cathode terminals 120 and the anode terminals 130 of battery cells 104 protrude outward from the upper ends of the battery cells 104. Therefore, a heat dissipation member 500 may be applied to the battery cells 104, the cathode terminals 120 and the anode terminals 130 of which protrude in the same direction, as well as to the battery cells 100 of FIG. 6, the cathode terminals 120 and the anode terminals 130 of which protrude in opposite directions. The battery module 400a of FIG. 13 is identical in the remaining structure to the battery module 400 of FIG. 6, and therefore, a detailed description thereof will not be given.

In a battery module 400b of FIG. 14, on the other hand, heat dissipation members 502 are disposed at one side of the battery cell stack. Therefore, the heat dissipation members 502 may be located at the top of the battery cell stack as in the battery module 400a of FIG. 13 or at the side of the battery cell stack as in the battery module 400b of FIG. 14. The battery module 400b of FIG. 14 is identical in the remaining structure to the battery module 400a of FIG. 13, and therefore, a detailed description thereof will not be given.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention is configured in a structure in which heat dissipation members are disposed in interfaces between battery cells for accelerating dissipation of heat from the battery cells, and therefore, it is possible to effectively discharge heat generated from the battery cells to the outside while minimizing the increase in size of the battery module.

The invention claimed is:

1. A battery module comprising:
a plurality of plate-shaped battery cells mounted in a module case in a state in which the plate-shaped battery cells are sequentially stacked, each of the plate-shaped battery cells including an electrode assembly of a cathode/separator/anode structure mounted in a battery case formed of a laminate sheet including a resin layer and a metal layer; and
a plurality of heat dissipation members disposed in two or more interfaces between the respective plate-shaped battery cells such that heat generated from the plate-shaped battery cells during charge and discharge of the plate-shaped battery cells is removed by thermal conduction through the heat dissipation members,
wherein each of the battery cells is mounted in a battery cartridge configured in a frame structure,
wherein the battery cartridge includes at least one pair of plate-shaped frames for fixing an outer circumference of a corresponding one of the battery cells in a state in which at least one major surface of the corresponding one of the battery cells is exposed,
wherein the frames are provided at outsides thereof with elastic pressing members for fixing the heat dissipation members to the exposed major surface of the corresponding one of the battery cells in a tight contact manner,
wherein each of the battery cells is mounted between the frames so that the exposed major surface of each of the battery cells protrudes outward from a corresponding one of the frames, and the elastic pressing members are provided at the outsides of the frames so that the elastic pressing members have a greater height than a protruding height of each of the battery cells at the exposed major surface thereof,
wherein the frames are provided at the outsides thereof with grooves, in which the elastic pressing members are mounted, and
wherein each of the battery cells protrudes outward from a corresponding one of the frames by extending above a top surface of the frame, the elastic pressing members are mounted to the top surface of the frame, and the top surface of the frame is located below the exposed major surface of each of the battery cells.

2. The battery module according to claim 1, wherein an air cooling heat exchange member is mounted at one side of the battery cell stack for integrally connecting the heat dissipation members to each other such that heat generated from the plate-shaped battery cells during charge and discharge of the plate-shaped battery cells is removed by thermal conduction through the air cooling heat exchange member via the heat dissipation members.

3. The battery module according to claim 1, wherein the laminate sheet is configured in a structure including an inner resin layer, which is thermally weldable, an isolation metal layer, and an outer resin layer.

4. The battery module according to claim 1, wherein the elastic pressing members are provided at upper and lower ends and/or left and right sides of the frames.

5. The battery module according to claim 1, wherein each of the elastic pressing members includes a polymer resin exhibiting elastic pressing force when the polymer resin is pressed.

6. The battery module according to claim 1, wherein the heat dissipation members have a thermal conductivity of 20 to 500 W/(m.K).

7. The battery module according to claim 2, wherein the air cooling heat exchange member has a thermal conductivity of 20 to 500 W/(m.K).

8. The battery module according to claim 2, wherein the heat dissipation members are disposed in the interfaces between the battery cells in a state in which at least a portion of each of the heat dissipation members is exposed outward from the stacked battery cells, and the outwardly exposed portions of the heat dissipation members are bent in a lateral direction of the battery cells.

9. The battery module according to claim 8, wherein the air cooling heat exchange member is mounted at tops of the bent portions of the heat dissipation members.

10. The battery module according to claim 9, wherein a thermal interface material is provided between the tops of the bent portions of the heat dissipation members and the air cooling heat exchange member.

11. The battery module according to claim 10, wherein the thermal interface material includes at least one selected from a group consisting of a thermally conductive grease, a thermally conductive epoxy-based bond, a thermally conductive silicone pad, a thermally conductive adhesive tape, and a graphite sheet.

12. The battery module according to claim 8, wherein the air cooling heat exchange member includes a bottom part, at a lower end surface of which the heat dissipation members are disposed in a tight contact manner, and a plurality of heat dissipation fins extending upward from the bottom part.

13. The battery module according to claim 12, wherein the heat dissipation fins of the air cooling heat exchange member extend upward from the bottom part in a longitudinal direction of the air cooling heat exchange member.

14. The battery module according to claim 12, wherein the heat dissipation fins of the air cooling heat exchange member extend upward from the bottom part in a lateral direction of the air cooling heat exchange member.

15. The battery module according to claim 12, wherein the air cooling heat exchange member has a surface area equivalent to 7 to 15 times a surface area of each of the battery cells.

16. The battery module according to claim 12, wherein the air cooling heat exchange member has a length equivalent to 30 to 70% of a length of the battery cell stack.

17. The battery module according to claim 12, wherein the air cooling heat exchange member has a width equivalent to 50 to 120% of a width of the battery cell stack.

18. The battery module according to claim 12, wherein the air cooling heat exchange member has a height equivalent to 20 to 50% of a height of the battery cell stack.

19. The battery module according to claim 2, wherein the air cooling heat exchange member is mounted to a top or a bottom of the module case.

20. The battery module according to claim 2, wherein the module case is provided at an upper end thereof with a depression having a size sufficient to receive the air cooling heat exchange member, and the air cooling heat exchange member has a height equal to or less than a height of a top of the module case when the air cooling heat exchange member is mounted in the depression.

21. A battery pack including two or more battery modules according to claim 1.

22. The battery pack according to claim 21, wherein the battery pack is used as a power source for electric vehicles, hybrid electric vehicles, or plug-in hybrid electric vehicles.

23. The battery module according to claim 1, wherein the frame has an outer edge and an inner edge spaced from the outer edge, the inner edge defining a central opening, and wherein the elastic pressing members are spaced from the inner edge and outer edge.

24. The battery module according to claim 1, wherein the frame has an outer edge and an inner edge spaced from the outer edge, the distance between the inner edge and outer edge defining a width and the inner edge defining a central opening, and wherein the width of the elastic pressing members is less than the width of the frame.

25. The battery module according to claim 1, wherein the elastic members extend outwardly from a surface of the frames.

\* \* \* \* \*